(12) United States Patent
Shen et al.

(10) Patent No.: US 10,415,973 B2
(45) Date of Patent: Sep. 17, 2019

(54) LOCATION WATCHING

(71) Applicant: Microsoft Technology Licensing, LLC, Redmond, WA (US)

(72) Inventors: Guo Bin Shen, Beijing (CN); Zheng Zhang, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 356 days.

(21) Appl. No.: 15/459,956

(22) Filed: Mar. 15, 2017

(65) Prior Publication Data
US 2017/0188196 A1    Jun. 29, 2017

Related U.S. Application Data

(63) Continuation of application No. 14/257,779, filed on Apr. 21, 2014, now Pat. No. 9,631,931, which is a (Continued)

(51) Int. Cl.
| | |
|---|---|
| *G01C 21/00* | (2006.01) |
| *H04W 4/029* | (2018.01) |
| *G01S 19/42* | (2010.01) |
| *G01S 5/02* | (2010.01) |
| *H04W 4/02* | (2018.01) |
| *H04W 84/04* | (2009.01) |
| *H04W 84/12* | (2009.01) |

(52) U.S. Cl.
CPC ............ *G01C 21/005* (2013.01); *G01S 5/02* (2013.01); *G01S 5/0205* (2013.01); *G01S 19/42* (2013.01); *H04W 4/023* (2013.01); *H04W 4/029* (2018.02); *H04W 84/042* (2013.01); *H04W 84/12* (2013.01)

(58) Field of Classification Search
CPC .... G01C 21/005; H04W 4/029; H04W 4/023; G01S 5/02; G01S 5/0205; G01S 19/42
USPC ........................................................ 342/518
See application file for complete search history.

(56) References Cited

U.S. PATENT DOCUMENTS

| | | |
|---|---|---|
| 6,236,357 B1 | 5/2001 | Corwith |
| 6,618,683 B1 | 9/2003 | Berstis et al. |
| | (Continued) | |

OTHER PUBLICATIONS

Ashbrook, et al., Using GPS to learn significant locations and predict movement across multiple users, Pers Ubiquit Comput 2003, 7: pp. 275-286.

(Continued)

*Primary Examiner* — Harry K Liu
(74) *Attorney, Agent, or Firm* — Schwegman Lundberg & Woessner, P.A.

(57) ABSTRACT

Techniques for watching a location of a device with respect to a destination target include obtaining a current location of a device from a localization operation, calculating an interval, and performing a next localization operation after the interval has expired. The interval may be calculated based on a velocity and a distance from the current location to a destination target. The techniques may also include calculating a displacement distance from the current location and adjusting the interval based on the displacement distance to thereby adjust a time for performing the next localization operation. The techniques may include performing state detection to determine a motion state of the device and performing the next localization operation based on the determined motion state.

20 Claims, 9 Drawing Sheets

Related U.S. Application Data continuation of application No. 13/289,896, filed on Nov. 4, 2011, now Pat. No. 8,704,710.

(56) References Cited

U.S. PATENT DOCUMENTS

| | | | |
|---|---|---|---|
| 7,907,838 B2 | 3/2011 | Nasiri et al. | |
| 9,273,968 B2* | 3/2016 | Oohashi | G01C 21/30 |
| 9,562,774 B2* | 2/2017 | Shimada | G01C 21/3655 |
| 9,650,039 B2* | 5/2017 | Hocking | B60W 30/02 |
| 2002/0158796 A1* | 10/2002 | Humphrey | G01C 21/165 |
| | | | 342/357.31 |
| 2003/0119529 A1 | 6/2003 | Hirokawa | |
| 2008/0070593 A1 | 3/2008 | Altman et al. | |
| 2009/0201149 A1 | 8/2009 | Kaji | |
| 2010/0130229 A1 | 5/2010 | Sridhara et al. | |
| 2010/0134288 A1 | 6/2010 | Huang et al. | |
| 2010/0210313 A1 | 8/2010 | Huang et al. | |
| 2010/0267378 A1 | 10/2010 | Hamabe et al. | |
| 2011/0050503 A1 | 3/2011 | Fong et al. | |
| 2011/0105158 A1 | 5/2011 | Arora et al. | |
| 2011/0117924 A1* | 5/2011 | Brunner | G01S 5/0252 |
| | | | 455/456.1 |
| 2011/0141006 A1 | 6/2011 | Rabu | |
| 2011/0246916 A1 | 10/2011 | Leskela et al. | |
| 2013/0018581 A1* | 1/2013 | Sidhu | G01C 21/16 |
| | | | 701/469 |
| 2014/0288826 A1 | 9/2014 | Shen et al. | |

OTHER PUBLICATIONS

CeSetUserNotificationEx, retrieved on Jun. 29, 2011 at <<http://msdn.microsoft.com/en-us/library/ms908105.aspx>>, 1 page.

Constandache et al., "Energy-efficient Localization Via Personal Mobility Profiling," Published Oct. 2009, retrieved at <<http://synrg.ee.duke.edu/papers/mobicase09.pdf>>, 20 pages.

Constandache, et al., EnLoc: Energy-Efficient Localization for Mobile Phones, In IEEE INFOCOM Mini Conference, 2009, 5 pages.

Dey, et al., CybreMinder: A Context-Aware System for Supporting Reminder, HUC 2000, pp. 172-186.

Dyor, Matthew "Location-Based Notification" U.S. Appl. No. 12/725,402, filed Mar. 16, 2010, 40 pages.

Dyor, Matthew "Managed Dissemination of Location Data" U.S. Appl. No. 12/958,325, filed Dec. 1, 2010, 42 pages.

Gaonkar, et al., Micro-Blog: Map-casting from Mobile Phones to Virtual Sensor Maps, SenSys 2007, 2 pages.

Google Latitude, retrieved on Jun. 29, 2011 from <<http://www.google.com/intl/en_us/latitude/intro.html>>, 1 page.

Griswold, et al., ActiveCampus: Experiments in Community-Oriented Ubiquitous Computing, Published by the IEEE Computer Society, Oct. 2004, pp. 73-81.

Gyorbiro, et al., An Activity Recognition System for Mobile Phones, Mobile Netw Appl (2009) 14: 82-91.

Hache, et al. Mobility Change-of-State Detection Using a Smarphone-base Approach, Medical Measurements and Applications Proceedings (MeMeA), 2010 IEEE International Workshop, Pub 2010, 4 pages.

He, et al., Activity Recognition from Acceleration Data Using AR Model Representation and SVM, Proceedings of the Seventh International Conference on Machine Learning and Cybernetics 2008, pp. 2245-2250.

Hightower, et al., Location Systems for Ubiquitous Computing, IEEE Computing, Aug. 2001, pp. 57-66.

Hoseinitabatabaei, et al., "uDirect: A Novel Approach for Pervasive Observation of User Direction with Mobile Phones," retrieved at <<http://www.percom.org/proceedings/main/papers/p74-hoseinitabatabaei.pdf>>, 2011 IEEE International Conference on Pervasive Computing and Communications (PerCom), Seattle, Mar. 21-25, 2011, 10 pages.

Johnson, Windows Mobile Power Management, retrieved on Jun. 28, 2011 from <<http://www.rdacorp.com/PDF/Windows Mobile Power Management.pdf>>, 19 pages.

JOYity—The Most Exciting Location-Based Gaming Platform, retrieved on Jun. 29, 2011 from <<http://www.joyity.com>>, 1 page.

Kim, et al., Detecting Energy-Greedy Anomalies and Mobile Malware Variants, MobiSys 2008, pp. 239-252.

Kim, et al., Extracting a Mobility Model from Real User Traces, In INFOCOM 2006, pp. 1-13.

Krumm, et al., The NearMe Wireless Proximity Server, UbiComp 2004, pp. 283-300.

Li, et al., PeopleTones: A System for the Detection and Notification of Buddy Proximity on Mobile Phones, MobiSys 2008, 14 pages.

Liao, et al., Building Personal Maps from GPS Data, Ann. N.Y. Aca. Sci. 1093: pp. 249-265, 2006.

Lin, et al., "Enabling Energy-Efficient and Quality Localization Services," Proceedings of the Fourth Annual IEEE International Conference on Pervasive Computing and Communications Workships, Mar. 13-17, 2006, retrieved at <<http://www.eecs.harvard.edu/~thlin/qols-percom06.pdf>>, 4 pages.

Lin, et al., Energy-Efficient Boundary Detection for RF-Based Localization Systems, Proceedings of Mobile Computing, 2009, pp. 29-40.

Loopt, retrieved on Jun. 29, 2011 at <<http://www.loopt.com>>, 6 pages.

Mahmoud, et al., Adaptive GPS Duty Cycling, retrieved from <<http://www.cs.ucsb.edu/~hatem/projects/AdaptiveDutyCycling.pdf>>on Jun. 29, 2011, 7 pages.

Marmasse, et al., A User-Centered Location Model, Personal and Ubiquitous Computing (2002) 6:318-321.

Marmasse, et al., Location-Aware Information Delivery with ComMotion, HUC 2000, pp. 157-171.

Mathias, SmartReminder: A Case Study on Context-Sensitive Applications, Technical Report Jun. 1, 2001, retrieved on Jun. 28, 2011 from <<http://citeseerx.ist.psu.edu/viewdoc/download?doi=10.1.1.73.1113&rep=rep1&type=pdf>>, 33 pages.

Miluzzo, et al., Sensing Meets Mobile Social Networks: The Design, Implementation and Evaluation of the CenceMe Application, SenSys 2008, pp. 337-350.

Mohan, et al., Nericell: Rich Monitoring of Road and Traffic Conditions using Mobile Smartphones, SenSys 2008, 14 pages.

Murugappan, et al., An Energy Efficient Approach to Processing Spatial Alarms on Mobile Clients, In Proceedings of the ISCA 17th International Conference on Software Engineering and Data Engineering, 2008, 15 pages.

Nham, et al., Predicting Mode of Transport from iPhone Accelerometer Data, retrieved on Jun. 28, 2011 from <<http://www.stanford.edu/class/cs229/proj2008/NhamSiangliulueYeung-PredictingModeOfTransportFromIphoneAccelerometerData.pdf>>, 5 pages.

Nicholson, et al., BreadCrumbs: Forecasting Mobile Connectivity, MobiCom 2008, 12 pages.

Office action for U.S. Appl. No. 14/257,779, dated Apr. 27, 2016, Shen et al., "Location Watching", 8 pages.

Office action for U.S. Appl. No. 14/257,779, dated Sep. 30, 2016, Shen et al., "Location Watching", 6 pages.

Pascoe, The Stick-e Note Architecutre: Extending the Interface Beyond the User, In IUI 1997, pp. 261-264, <<http://citeseerx.ist.psu.edu/viewdoc/download?doi=10.1.1.55.3237&rep=rep1&type=pdf>>.

Placelab.org, retrieved on Jun. 29, 2011 at <<http://www.placelab.org >>, 2 pages.

Ravi, et al., Activity Recognition from Accelerator Data, American Association for Artificial Intelligence (www.aaai.org), 2005, 6 pages.

Shafer et al., "Movement Detection for Power-Efficient Smartphone WLAN Localization," Published Oct. 17-21, 2010, MSWiM 2010, Bodrum, Turkey, retrieved at <<http://fsweb.olin.edu/~mchang/publications/mswim27f-shafer.pdf>>, 10 pages.

Sohn, et al., Place—Its: A Study of Location-Based Reminders on Mobile Phones, UbiComp 2005, pp. 232-250.

Thiagarajan, et al., VTrack: Accurate, Energy-Aware Road Traffic Delay Estimation Using Mobile Phones, SenSys 2009, 14 pages.

(56) References Cited

OTHER PUBLICATIONS

Top 50 Google Android Applications, retrieved on Jun. 29, 2011 at <<http://www.talkandroid.com/92-developer-challenge-top-50-android-application/>>, 13 pages.

Wang, et al., "A Framework of Energy Efficient Mobile Sensing for Automatic User State Recognition," Published Date: Jun. 22-25, 2009, MobiSys 2009, Krakow, Poland, , retrieved at <<http://www.usc.edu/dept/ee/scip/assets/002/63910.pdf>>, 14 pages.

Yamanaka, et al., Localization of Walking or Running User with Wearable 3D Position Sensor, 17th International Conference on Artificial Reality and Telexistence, IEEE 2007, pp. 39-45.

Yoon, et al., Building Realistic Mobility Models from Coarse-Grained Traces, MobiSys 2006, pp. 177-190.

You et al., "Impact of Sensor-Enhanced Mobility Prediction on the Design of Energy—Efficient Localization," Published Nov. 2008, retrieved at <<http://mll.csie.ntu.edu.tw/papers/ad_hoc_journal_final.pdf>>, 19 pages.

Zheng, et al., GeoLife2.0: A Location-Based Social Networking Service, 2009 Tenth International Conference on Mobile Data Management: Systems, Services and Middleware, IEEE 2009, pp. 357-358.

Zheng, et al. "Mining Correlation Between Locations Using Location History" U.S. Appl. No. 12/711,130, filed Feb. 23, 2010, 47 pages.

Zheng, et al. "Route Computation Based on Route-Oriented Vehicle Trajectories" U.S. Appl. No. 12/712,053, filed Feb. 24, 2010, 49 pages.

\* cited by examiner

```
                    ┌─────────────────────────┐
                    │    CELL READING 1       │
                    │                         │
                    │   CELL TOWER 1 DATA     │
                    │   CELL TOWER 5 DATA     │
                    │   CELL TOWER 8 DATA     │
                    └─────────────────────────┘

┌─────────────────────────┐
                    │    CELL READING 2       │
                    │                         │
                    │   CELL TOWER 5 DATA     │
                    │   CELL TOWER 6 DATA     │
                    │   CELL TOWER 8 DATA     │
                    └─────────────────────────┘
```

LOCATION WATCHING

RELATED APPLICATIONS

This application is a continuation of U.S. patent application Ser. No. 14/257,779, filed on Apr. 21, 2014, which is a continuation application of U.S. patent application Ser. No. 13/289,896, filed on Nov. 4, 2011, and entitled "Location Watching", now U.S. Pat. No. 8,704,710, which Issued on Apr. 22, 2014 the entirety of which is incorporated herein by reference.

BACKGROUND

Many mobile applications and services utilize geographic location data of a mobile device to provide proximity notifications. These applications and services obtain a location of the mobile device through localization operations which either obtain location coordinate readings from a global positioning system (GPS), or obtain readings from cell towers and/or wireless access points and resolve the location through online queries. With the location, these applications and services evaluate a proximity of the mobile device to a predefined destination target. When the mobile device is in proximity to the destination target, a notification is provided on the mobile device.

In this approach, the applications and services continuously perform operations for localization and evaluation. These applications and services continuously obtain either location coordinate readings from the GPS, or readings from cell towers and/or wireless access points. Meanwhile, the applications and services continuously evaluate the location of the mobile device with respect to the destination target.

This approach consumes significant energy and has adverse effects on the mobile device. For example, obtaining location coordinate readings from the GPS, and readings from cell towers or wireless access points requires a significant amount of communication power, which quickly reduces the battery life of a mobile device. Furthermore, in order to obtain the location with readings from cell towers or wireless access points, the location must be resolved with online queries, which requires further communication power.

There is an increasing opportunity to watch a location of a mobile device with respect to a destination target and provide notifications in an energy-efficient manner.

SUMMARY

This Summary is provided to introduce a selection of concepts in a simplified form that are further described below in the Detailed Description. This Summary is not intended to identify key or essential features of the claimed subject matter, nor is it intended to be used to limit the scope of the claimed subject matter.

This disclosure is related to, in part, obtaining a current location from a localization operation, calculating an interval defining a sampling period for performing a next localization operation, and performing the next localization operation after the interval has expired. The interval may be calculated based on a velocity and a distance from the current location to a destination target. The interval may also be calculated to be shorter in time than a time to travel from the current location to the destination target.

This disclosure is also related to, in part, calculating a displacement distance and adjusting the interval based on the displacement distance. For example, the displacement distance may be calculated by estimating a displacement from the current location after the interval has expired. Meanwhile, the interval may be adjusted in proportion to the displacement distance to thereby adjust a time for performing the next localization operation.

This disclosure is also related to, in part, performing state detection to determine a motion state of a device. State detection may be performed when the interval is determined to be less than a threshold time. Performing state detection may include utilizing data obtained from an accelerometer of the device, and determining a moving or still state.

BRIEF DESCRIPTION OF THE DRAWINGS

The detailed description refers to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
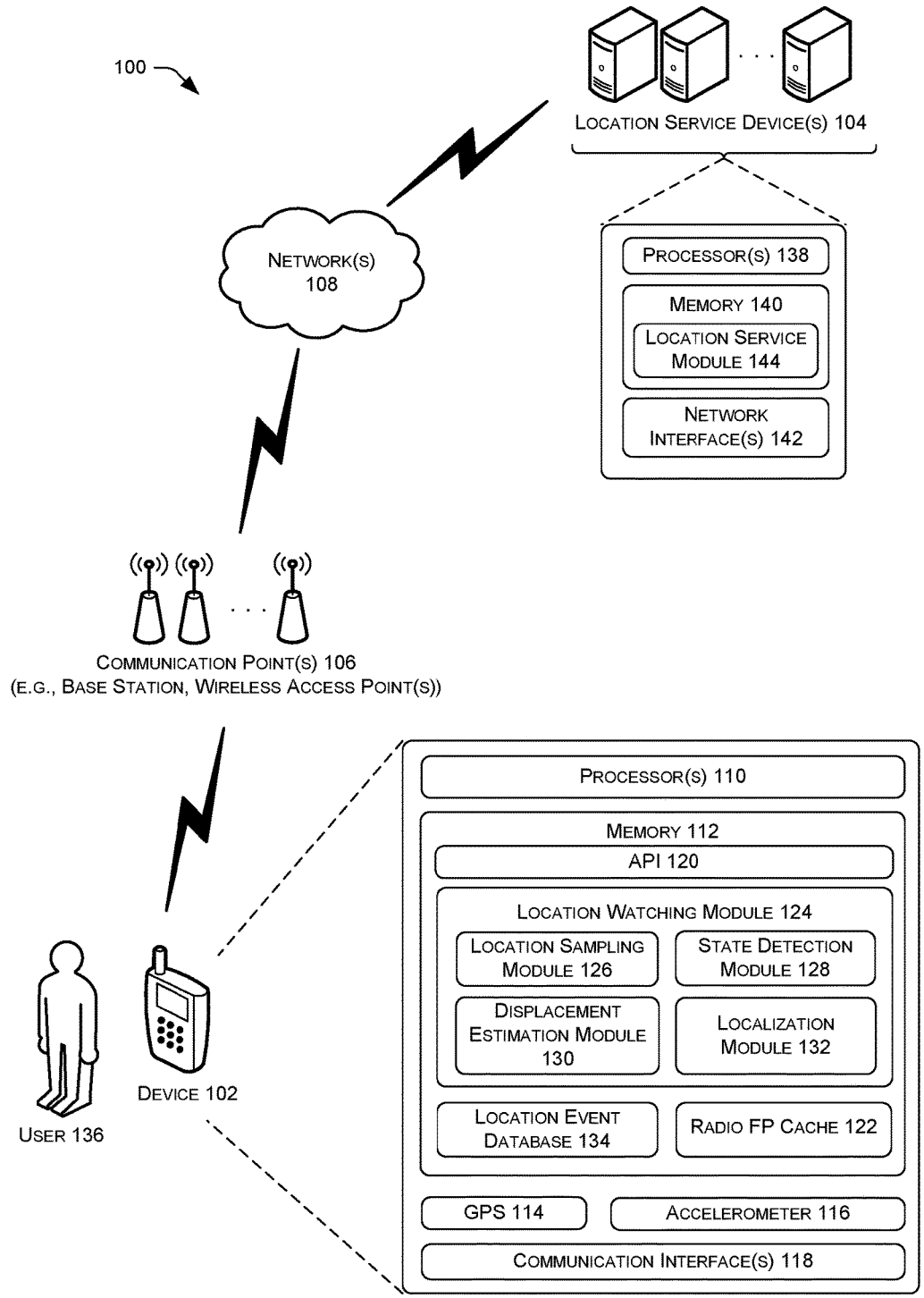
FIG. 1 illustrates an exemplary architecture in which techniques described herein may be implemented.

This disclosure describes a variety of location watching techniques for watching a location of a device with respect to a destination target.

As discussed above, many mobile applications and services continuously perform operations for localization and evaluation, which consumes significant energy and has adverse effects on a mobile device. This disclosure describes techniques that, among other things, watch a location of a device with respect to a destination target in an energy efficient manner.

Aspects of this disclosure are directed to performing a localization operation at a time based on a distance from a current location to a destination target. The device may obtain the current location from a localization operation, calculate an interval defining a sampling period for performing a next localization operation, and perform the next localization operation after the interval has expired. The interval may be calculated based on a velocity and the distance from the current location to the destination target. The interval may also be calculated to be shorter in time than a time to travel from the current location to the destination target. The localization operation may utilize a global positioning system (GPS), cellular-based proximity localization, and/or wireless-based proximity localization.

Aspects of this disclosure are also directed to adjusting a time to perform a localization operation based on a displacement of the device from the current location. The device may obtain first and second cell readings each identifying a plurality of cell towers and compare the first and second cell readings to determine whether any common cell towers are included in the first and second cell readings. The device may then utilize the determination to calculate the displacement distance from the current location. For example, the displacement distance may be calculated in proportion to a number of common cell towers. Thereafter, the device may adjust the interval based on the calculated displacement distance and set the device to a sleep or suspended mode for the adjusted interval. When the device awakes from the sleep or suspended mode, a localization operation (e.g., a next localization operation) may be performed.

Aspects of this disclosure are also directed to performing a localization operation (e.g., a next localization operation) based on a state determined through state detection. The device may perform state detection to determine a motion state of the device when the interval is less than a threshold. The device may then perform the localization operation (e.g., the next localization operation) when the state detection determines a moving state. When the state detection determines a still state, the device may continue performing state detection.

The techniques described below may allow for adaptive adjustment of a time for performing a localization operation. For example, when the device is farther away from a destination target the localization operation may be performed less frequently than when the device is near the destination target. The techniques below may also allow a localization operation to be performed less frequently compared to techniques which continuously perform localization operations. This may reduce energy consumption associated with a localization operation and prolong battery life of the device.

The sections below are examples provided for the reader's convenience and are not intended to limit the scope of the claims, nor the proceeding sections. Furthermore, the techniques described in detail below may be implemented in a number of ways and in a number of contexts. One example implementation and context is provided with reference to the following figures, as described below in more detail. However, the following implementation and context is but one of many.

Illustrative Architecture

FIG. 1 illustrates an exemplary architecture 100 in which techniques described herein may be implemented. Here, the techniques are described in the context of a device 102 to communicate with a location service device(s) 104 by means of a communication point(s) 106 and a network(s) 108. For instance, device 102 may communicate with location service device(s) 104 to provide and/or receive location information and location events described hereafter.

In architecture 100, device 102 may include any combination of hardware and/or software resources configured to process data. Device 102 may be implemented as any number of devices, including a personal computer, a laptop computer, a cell phone, a tablet device, a personal digital assistant (PDA), etc. Device 102 may be equipped with a processor(s) 110 and memory 112. Device 102 may also be equipped with a global positioning system, such as GPS 114, an accelerometer 116, and/or a communication interface(s) 118.

Memory 112 may include an application programming interface, such as API 120, and a radio finger print cache, such as radio FP cache 122. Memory 112 may be configured to store applications and data. An application, such as a location watching module 124, running on device 102 performs operations for location watching.

Location watching module 124 may include a location sampling module 126, a state detection module 128, a displacement estimation module 130, and a localization module 132. Modules 126-132, running on device 102, perform operations for location sampling, state detection, displacement estimation, and localization to be described herein.

Localization module 132 may perform a localization operation. As used herein, the term "localization operation," or "localization," refers to techniques which determine a location of a device through either location coordinate readings from a global positioning system (GPS), or readings from cell towers and/or wireless access points coupled with online queries to resolve the location. Such techniques generally include communication with one or more satellites, cell towers (e.g., base stations), and/or wireless access points, and may include querying an online service. These techniques may provide the location of the device in a geo-location form (i.e., longitude and latitude), address form, or any other suitable location format, and may include time and date information. A localization operation may also include reporting the location of the device to a location-based service through a network.

Memory 112 may also be configured to store location events in a location event database 134. A location event may be set by a user 136, received over network(s) 108, or otherwise set and/or received. The location event may identify a destination target, define a notification, and/or define a condition for triggering the notification. For instance, the location event may identify a static target (e.g., a fixed target), such as a store, park, or another fixed location. Alternatively, the location event may identify a dynamic target (e.g., a moving target), such as a friend's device in a moving car. Meanwhile, the location event may also define the notification, such as displaying a message on a display screen or reproducing a predefined alert sound. Furthermore, the location event may define the condition for triggering the notification, such as a proximity condition. For instance, the location event may include a condition indicating that a notification should be triggered when a device is within a predetermined proximity to a destination target.

Although memory 112 is depicted in FIG. 1 as a single unit, memory 112 may include one or a combination of computer readable media. Computer readable media may include computer storage media and/or communication media. Computer storage media includes volatile and non-volatile, removable and non-removable media implemented in any method or technology for storage of information such as computer readable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer readable instructions, data structures, program modules, or other data in a modulated data signal, such as a carrier wave, or other transmission mechanism. As defined herein, computer storage media does not include communication media.

Architecture 100 also includes communication point(s) 106, such as a cell tower(s) (i.e., cell base station), a wireless access point(s), or a similar communication point configured to communicate with a device. Communication point(s) 106 may be implemented as appropriate in hardware and include software components. While techniques described herein are illustrated with reference to cell towers and wireless access points, these techniques may additionally or alternatively apply to any other type of communication point enabling communication with a device (e.g., any type of RF-based communication point).

Meanwhile, architecture 100 also includes network(s) 108 and location service device(s) 104. Network(s) 108 may include any one or combination of multiple different types of networks, such as cellular networks, wireless networks, local area networks, and the Internet. Location service device(s) 104 may include any combination of hardware and/or software configured to process data. Location service device(s) 104 may be implemented as any number of devices, including, for example, one or more servers, a personal computer, or a laptop computer. In one example, location service device(s) 104 includes one or more servers in a data center or cloud computing environment. Location service device(s) 104 is also equipped with a processor(s) 138, memory 140, and a network interface(s) 142. Memory 140 may include one or a combination of computer readable media.

Memory 140 may be configured to store applications and data. An application, such as a location service module 144, running on location service device(s) 104 performs operations for a location-based service.

As an overview, a location-based service may monitor a location of a device(s) and perform operations based on the monitored location. Such location-based service may include proximity reminder services, tracking services, and location-based gaming. During implementation of the location-based service, location service device(s) 104 may receive a location of a device, store the location, perform operations based on the location, and send location-based information to one or more devices.

For example, location service device(s) 104 may receive a current location of device 102 from device 102, monitor a current location of device 102, and notify device 102 when a condition is satisfied, such as the current location being within a predetermined proximity to a destination target.

In a further implementation of the location-based service, location service device(s) 104 monitors current locations of two or more devices. Here, the monitored current locations may be compared to determine a proximity of the locations and provide notifications to the two or more devices when it is determined that the devices are within a predetermined proximity to each other.

Aspects of this disclose are directed to location-based applications and services where a destination target is predefined. Such applications and services may include, for example: location reminder applications, where a user is notified upon arrival at a predefined location; mobile social games, where a user achieves tasks upon arrival at a predefined location; and mobile social tracking applications, where a user is notified when in proximity to another user (e.g., a friend).

Illustrative Location Sampling

The following section describes techniques directed to performing localization at a time based on a distance from a current location to a destination target. These techniques may allow for adaptive adjustment of a time for performing localization. These techniques may also allow a number of localizations to be reduced when a destination target is farther away.

Figure 2:
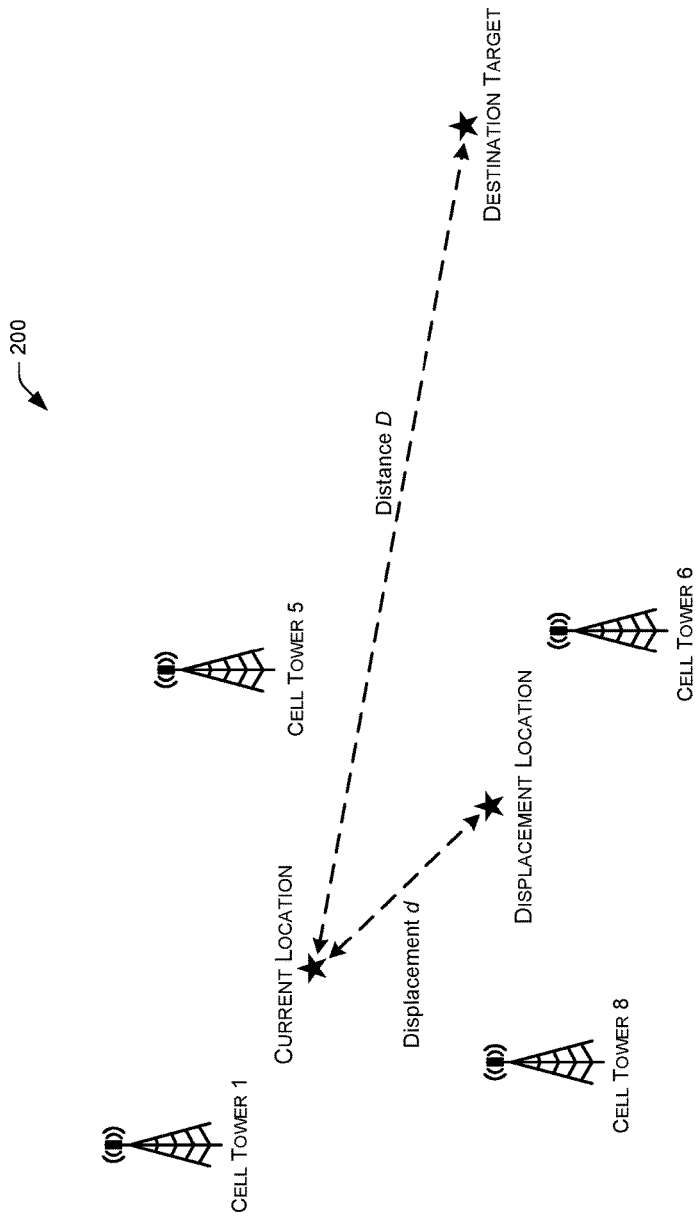
FIG. 2 illustrates an exemplary map of locations, cell towers, and distances utilized to determine a time for performing localization.

FIG. 2 illustrates an exemplary map of locations, cell towers, and distances utilized to determine a time for performing localization. Here, FIG. 2 includes a current location of a device, a displacement location of the device from the current location, and a destination target, each represented with a corresponding star. FIG. 2 also includes distance D from the current location to the destination target, and displacement distance d from the current location to the displacement location. Meanwhile, FIG. 2 also includes cell towers labeled cell tower 1, cell tower 5, cell tower 6, and cell tower 8 to be described in further detail below.

In one aspect of this disclosure, a device, such as device 102, performs a localization operation to obtain the current location of the device. The device also obtains the destination target by means of user input, a location event, input from another application or service running on the device or remotely, and/or data previously stored on the device. The destination target may be a static or dynamic target.

Meanwhile, the device may also obtain a velocity of the device. The velocity may be an estimated velocity in a direction from the current location to the destination target. The velocity may be based on data obtained from an accelerometer of the device, which may indicate a motion speed or state of the device. For example, when the accelerometer data indicates that the device is in a driving, walking, or running state, the velocity may be estimated as a speed corresponding to driving, walking, or running. The velocity may also be estimated to be a maximum velocity of the motion state. These estimations may be obtained from statistical analyses of historical data for the device and/or other devices or input from a user. The velocity may also be set to a road speed limit, a percentage (e.g., 90%) of a fastest speed of the device in a previous period (e.g., a previous week), or a predicted velocity obtained through a service utilizing a location of the device and surrounding traffic information.

Thereafter, the device may calculate an interval based on a distance from the current location to the destination target and the velocity. This interval is referred to herein as a "safe interval," and defines a sampling period for performing a localization operation (e.g., a next localization operation).

The interval may consider a proximity of the device to the destination target. Here, the interval may be based on a distance from the current location to a region around the destination target, where the region is defined through user input or based on characteristics of the destination target. For example, a first region may be defined for a dynamic destination target, and a second region may be defined for a static destination target, where the first region is larger in area than the second region. In another example, a user may input a proximity distance to the destination target (e.g., a radius distance) defining the region around the destination target. This may allow the user to set a granularity for a notification alert described below.

In one implementation, an interval is calculated from equation (1) shown below:

$$\tau_0 = \frac{D-r}{v}. \tag{1}$$

Here, $\tau_0$ represents the interval, D represents a distance from a current location of a device to a destination target, r represents a radius defining a region around the destination target, and v represents a velocity. In one example, velocity v represents a maximum velocity in order to consider an estimated maximum future velocity.

In a further implementation which considers a dynamic destination target, an interval is calculated from equation (2) shown below:

$$\tau_0 = \frac{D-r}{v_1 + v_2}. \quad (2)$$

Here, $\tau_0$ represents the interval, D represents a distance from a current location of a device to a destination target, r represents a radius defining a region around the destination target, $v_1$ represents a velocity of the device, and $v_2$ represents a velocity of the destination target. In one example, $v_1+v_2$ represents a maximum velocity for the device and the destination target to meet.

Meanwhile, a calculated interval may be utilized to determine when to perform a localization operation to obtain a location of a device. Here, the interval may define a sampling period for the localization operation. In other words, the interval may define a time to perform the localization operation. For example, the device may perform a localization operation, calculate an interval, and set the device to a sleep or suspended mode for the interval to minimize energy consumption and conserve battery life of the device. When the interval has expired, the device awakes from the sleep or suspended mode and a next localization operation is performed.

In one aspect of this disclosure, the techniques discussed above allow localization to be adaptive. For instance, by setting the device to a sleep or suspended mode for a calculated interval and performing a localization operation after the device awakes, the localization operation is performed based on the interval. In other words, when the interval is longer, the device may be set to the sleep or suspended mode for a longer period of time, and when the interval is shorter, the device may be set to the sleep or suspended mode for a shorter period of time.

Furthermore, by calculating the interval based on a distance from a current location to a destination target, the localization operation is performed based on the distance. For instance, when the distance to the destination target is longer, the localization operation may be performed later in time. Alternatively, when the distance to the destination target is shorter, the localization operation may be performed sooner in time.

Illustrative Displacement Estimation

The following section describes techniques directed to calculating a displacement distance from a current location and adjusting an interval based on the displacement distance to thereby adjust a time for performing a localization operation. These techniques may allow the time for performing the localization operation to be further adapted based on the displacement distance.

In one implementation, a displacement distance is calculated after a device awakes from a sleep or suspended mode and before a next localization operation is performed. The displacement distance may be an estimated distance traveled by the device since a previous localization operation (e.g., an immediately preceding localization operation). FIG. 2 illustrates one example of a displacement distance (i.e., displacement distance d) and an associated displacement location. The displacement distance may be based on two or more cell or wireless access point readings obtained at different times. The displacement distance may also be proportional to a number of common cell towers or wireless access points identified in the two or more readings. Although the techniques described below generally refer to cell readings, it is appreciated that these techniques may equally apply to wireless access point readings.

A cell or wireless access point reading may generally include identification information, such as information identifying a cellular cell, a cell tower (i.e., a base station), a wireless access point, or other similar identification-based information. For example, the cell reading may include a Location Area Code (LAC), Cell Identity (CellID), Mobile Country Code (MCC), Mobile Network Code (MNC), and/or a Signal-to-Noise Ratio (SNR) value. Meanwhile, the wireless access point reading (i.e., wireless access point data) may include identification information from a Wifi™ or Bluetooth™ access point associated with a public or private network. The wireless access point reading may also include any type of identification information identifying the wireless access point.

FIGS. 2-5 illustrate a technique for obtaining cell readings and calculating a displacement distance. In reference to FIGS. 2 and 3, a device, such as device 102, obtains a first cell reading (i.e., cell reading 1) at the current location at a time to, and obtains a second cell reading (i.e., cell reading 2) at the displacement location at time ti. Such cell readings may include information identifying cell towers to which communication is possible due to a communication coverage (i.e., a coverage area) of the cell tower. The cell readings may also include information identifying the cell, such as the cell identity.

Figure 3:
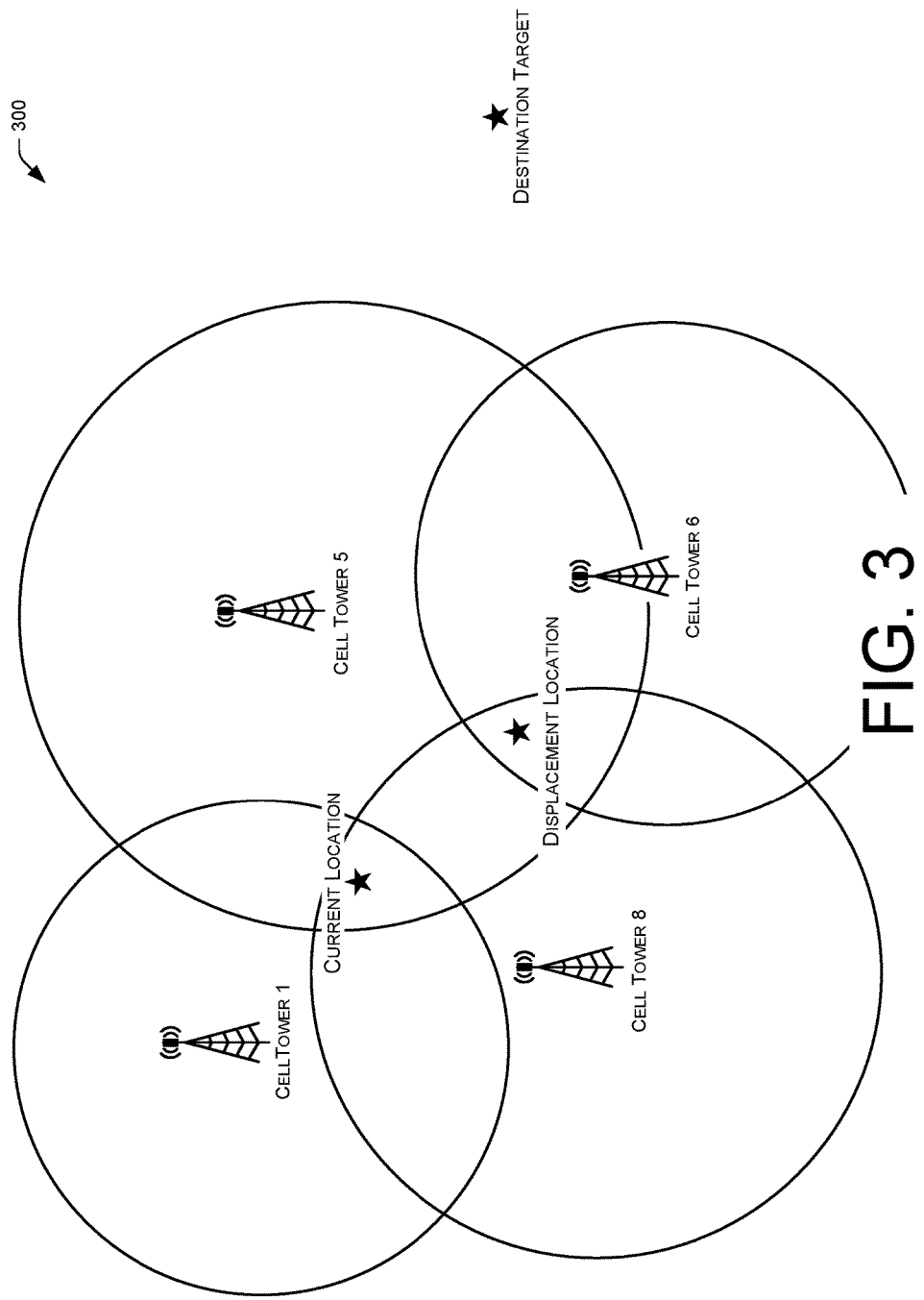
FIG. 3 illustrates an exemplary coverage area of cell towers.
Figure 4:
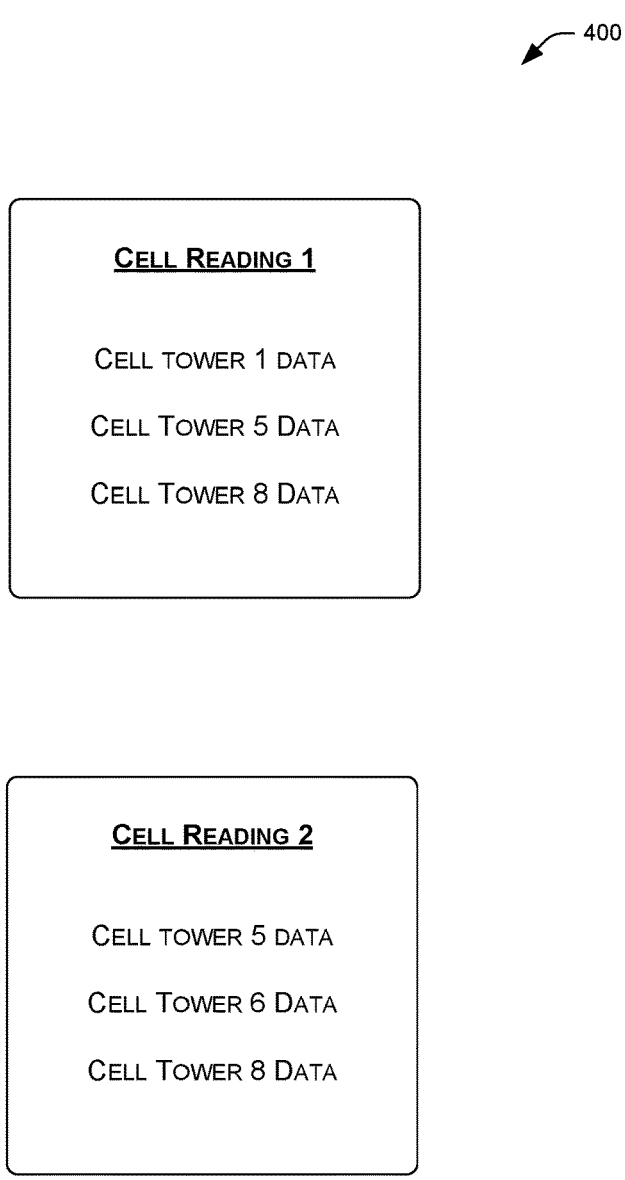
FIG. 4 illustrates exemplary cell readings identifying cell towers.

FIG. 3 illustrates an exemplary coverage area of cell tower 1, cell tower 5, cell tower 6, and cell tower 8. Here, when at the current location, the device is within cell coverage of cell tower 1, cell tower 5, and cell tower 8, and when at the displacement location, the device is within cell coverage of cell tower 5, cell tower 6, and cell tower 8. Accordingly, as shown in FIG. 4, cell reading 1 indentifies cell tower 1, cell tower 5, and cell tower 8, and cell reading 2 identifies cell tower 5, cell tower 6, and cell tower 8.

Figure 5:
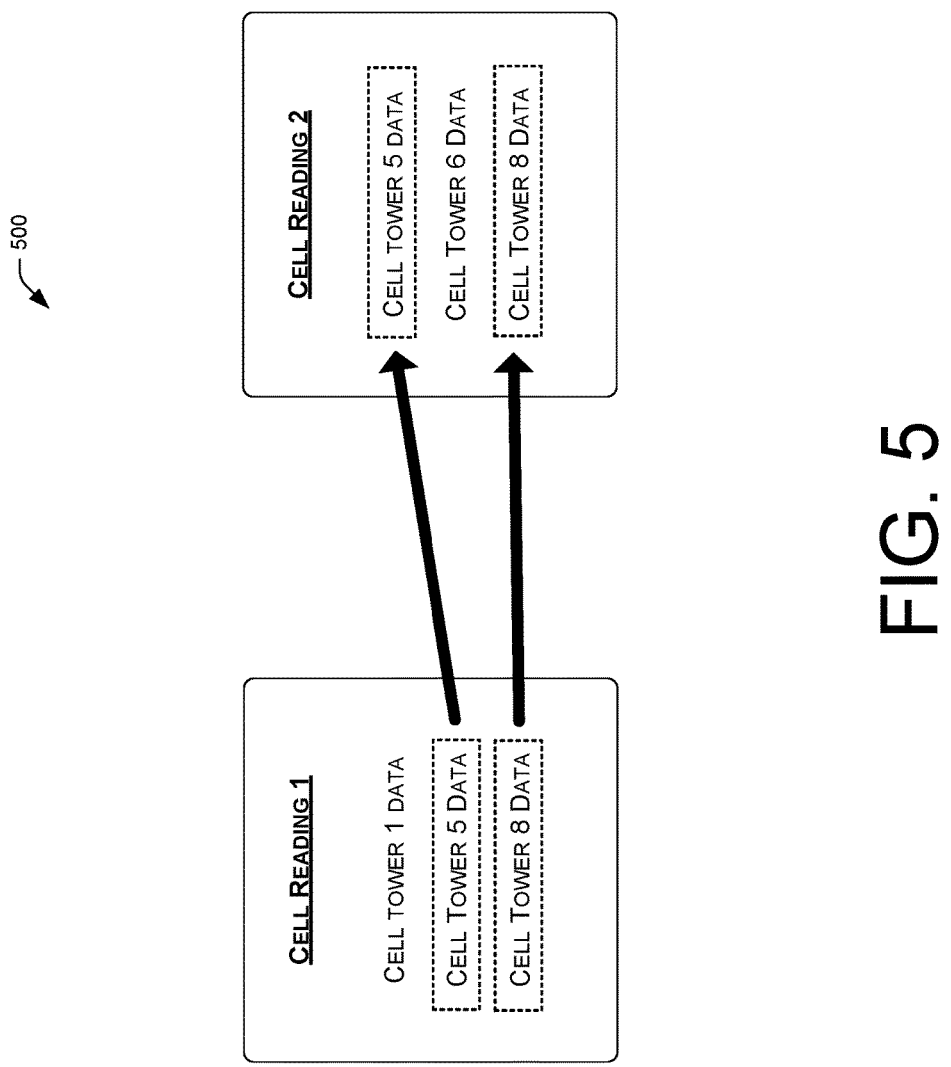
FIG. 5 illustrates an exemplary technique for calculating a displacement distance.

Meanwhile, cell readings may be utilized to calculate the displacement distance. The displacement distance may be calculated in proportion to a number of common cell towers identified in the cell readings. FIG. 5 illustrates an exemplary technique for calculating a displacement distance. Here, the identified cell towers of cell reading 1 are compared with the identified cell towers of cell reading 2. As shown, cell readings 1 and 2 include two common cell towers, cell tower 5 and cell tower 8. Based on these common cell towers, the device may calculate the displacement distance by referring to known coverage information.

Figure 6:
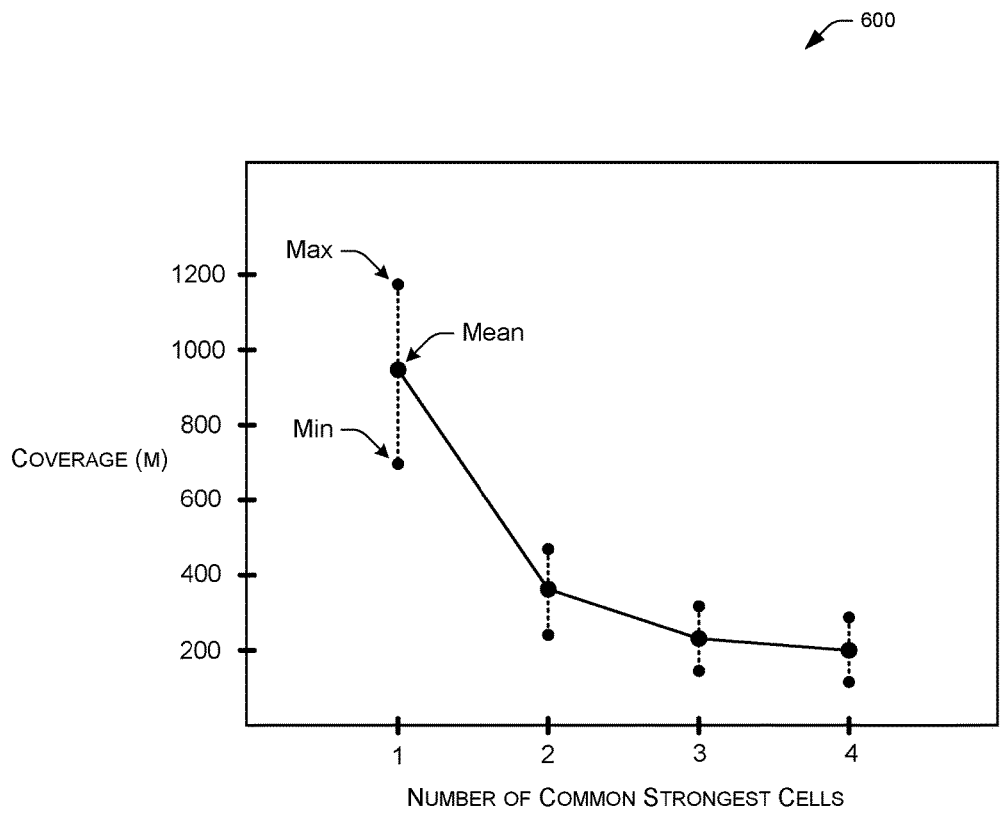
FIG. 6 illustrates an exemplary graph of known coverage information that may be used in calculating a displacement distance.

FIG. 6 illustrates an exemplary graph of known coverage information that may be used in calculating a displacement distance. This graph shows coverage distances with respect to a number of common strongest cells associated with cell towers. Here, the y-axis represents a coverage distance in meters (m), and the x-axis represents a number of common strongest cells. For instance, as shown, a minimum coverage distance for one common strongest cell is about 750 m, a mean coverage distance of one common strongest cell is about 900 m, and a maximum coverage distance for one common strongest cell is about 1200 m. Similar, minimum, mean, and maximum distances are shown for two, three, and four common strongest cells. For example, a mean coverage distance for two common strongest cells is about 350 m, a mean coverage distance for three common strongest cells is about 230 m, and a mean coverage distance for four common strongest cells is about 190 m. A strongest cell(s) may be exposed through a Radio Interface Layer (RIL) of the device.

In one implementation, the device calculates the displacement distance utilizing this known coverage information. For example, the displacement distance may correspond to the minimum, mean, or maximum coverage distance of the number of common strongest cells associated with the cell towers. In a conservative approach, the displacement distance may be calculated to be the maximum coverage distance. For instance, the device may determine that the cell readings include two common cell towers, and calculate the displacement distance to be the maximum coverage distance of two common strongest cells (i.e., about 475 m) associated with the two common cell towers. Alternatively, the device may determine that the cell readings include one common cell tower, and calculate the displacement distance to be the maximum coverage distance of one common strongest cell (i.e., 1200 m). In the example of FIG. 6, the displacement distance may be calculated to be shorter when the number of common strongest cells is larger.

Meanwhile, a conservative approach may be utilized to calculate one or more displacement distances in a situation where a device performs a localization operation (e.g., a next localization operation) after traveling to more than one location (e.g., a first and second location) and awaking from a sleep or suspended mode. In this situation, the device may assume that the one or more displacement distances are in a direction towards a destination target. In addition, the device may assume that the first and second locations are on a straight line in a direction from a start location towards a destination target. This approach is illustrated in FIG. 7.

Figure 7:
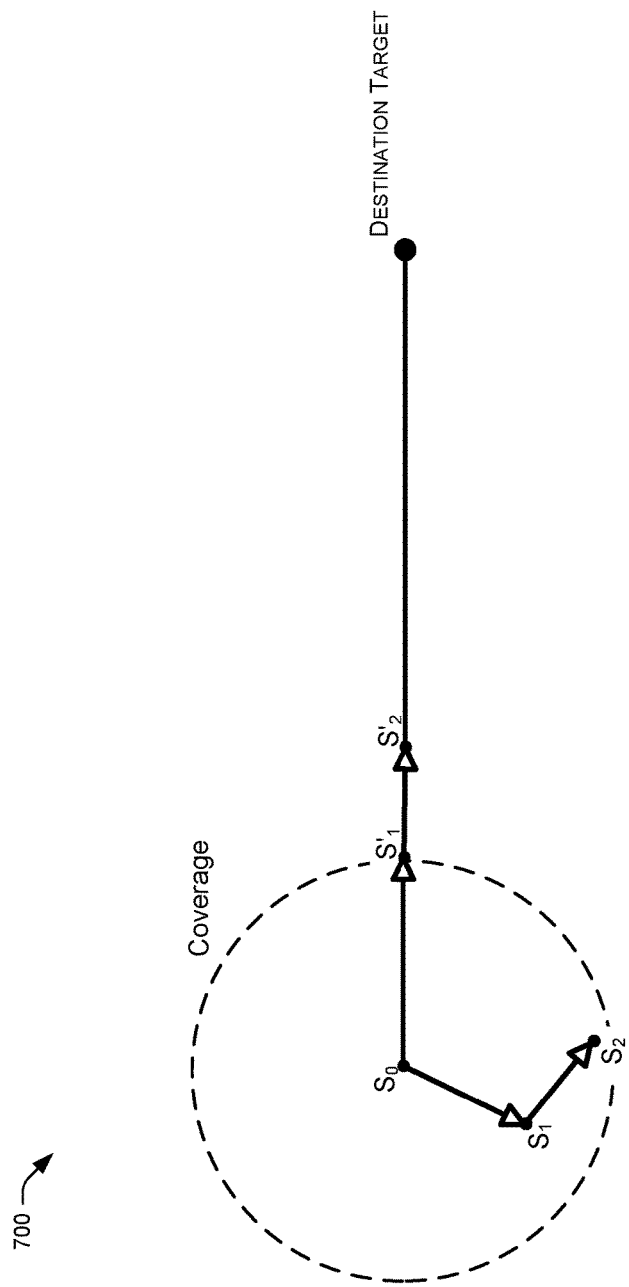
FIG. 7 illustrates an exemplary conservative approach which may be utilized to calculate a displacement distance.

In FIG. 7, while at location $S_0$ a device performs a localization operation, calculates an interval, and sets the device to a sleep or suspended mode for the interval. Thereafter, the device travels to location $S_1$, which is where the device is located when the interval expires and the device awakes from the sleep or suspended mode. At location $S_1$, the device calculates a displacement distance, adjusts the previous interval, and sets the device to a sleep or suspended mode for the adjusted interval. Thereafter, the device travels to location $S_2$, which is where the device is located when the adjusted interval expires and the device awakes from the sleep or suspended mode. At location $S_2$, the device calculates a displacement distance. The displacement distance calculated at $S_2$ may be a displacement distance from location $S_0$. However, in this situation the device may not be able to calculate a direction of the displacement distances calculated at $S_1$ and $S_2$. To address this situation, the device may assume that the displacement distances are in a direction toward the destination target. For example, the device may assume that the displacement distances are in a straight direction to the destination target, from $S_0$ to $S'_1$ and from $S'_1$ to $S'_2$. This approach may be considered conservative as it may generally lead to more frequent localizations.

As also shown in FIG. 7, the device may calculate the displacement distance to be a coverage distance of a common strongest cell, such as a maximum coverage distance. The coverage distance of the common strongest cell may be utilized when the device is not capable of retrieving multiple cell tower readings. Here, a radius of a circle centered on $S_0$ represents a coverage distance of a common strongest cell. Meanwhile, the device may estimate that the device traveled an estimated distance (i.e., displacement distance) from $S_0$ to $S'_1$ even though the device actually traveled a distance from $S_0$ to $S_1$. This estimated distance may correspond to the coverage distance of the common strongest cell, as illustrated by an arrow from $S_0$ to $S'_1$ which ends at the circle.

One or more displacement distances may also be calculated based on more than one previous cell reading stored in a device. For example, the one or more displacement distances may be calculated based on a comparison of a current cell reading(s) with a plurality of cell readings obtained at a plurality of locations where localization operations were performed. Here, the device may perform a localization operation when the comparison indicates that there is no common cell tower, and may calculate multiple displacement distances when the comparison indicates at least one common cell tower. These multiple displacement distances may be distances from a current location of the device. In one example, the displacement distance having the longest distance from among the multiple displacement distances is utilized to adjust an interval.

Meanwhile, a displacement distance may be utilized to adjust an interval or perform a localization operation (e.g., a next localization operation). In one instance, the displacement distance is compared to a displacement threshold to determine whether to adjust the interval or perform the localization operation. This threshold may be set by a user or set based on the known coverage information discussed above. For example, the threshold may be set to a larger value when the mean coverage distance for one common cell is larger, and may be set to a smaller value when the mean coverage distance is smaller. The displacement threshold may also be set based on a number of common cell towers. This approach may avoid a delayed determination that the device is at the destination target.

Meanwhile, when the comparison determines that the displacement distance is less than the displacement threshold, the device may adjust the interval. The device may thereafter be set to a sleep or suspended mode for the adjusted interval. Alternatively, when the comparison determines that the displacement distance is greater than the displacement threshold, the device may perform a localization operation (e.g., a next localization operation) in response to the determination. In one example, when the displacement threshold is set based on no common cell towers, as discussed above, the interval is adjusted iteratively until there are no common cell towers included in two or more cell readings, and when there are no common cell towers a localization operation is performed.

In one implementation, an adjusted interval (i.e., a next interval) is calculated in accordance with equation (3) shown below:

$$\tau_i = \tau_{i-1} - \frac{d}{v}. \quad (3)$$

Here, $\tau_i$ represents an adjusted interval, $\tau_{i-1}$ represents a previous interval, d represents a displacement distance from a previous location of a device, v represents a velocity, and i=1, 2, . . . . In one example, the velocity represents a maximum velocity.

This equation may allow for a transitivity of relative displacement, which may be an option when the device is capable of obtaining multiple cell readings and there is partial overlap among neighboring cell readings. For example, this equation may allow a device to adjust an interval based on an immediately preceding interval. In view of this issue, in one example, when only one cell tower is identified in a cell reading and it is the same as a previous cell tower of a previous cell reading, the interval remains the same. In another example, when a new cell reading is obtained, the new cell reading is compared to a cell reading obtained at a location where a localization was performed. This may avoid an accumulation of location errors.

In one implementation, the adjusted interval is utilized to determine a time to perform a localization operation (e.g., a next localization operation). Here, the device may be set to a sleep or suspended mode for the adjusted interval. Thereafter, when the device awakes from the sleep or suspended mode, the localization operation may be performed. In one aspect, the adjusted interval allows a time for performing a localization operation is to be further adjusted by setting the device to a sleep or suspended mode for the adjusted interval and performing the localization operation after the device awakes.

Illustrative State Detection

The following section describes techniques directed to performing state detection to determine a motion state of a device and performing a localization operation based on the determination. The state detection may utilize data from an accelerometer of the device. The techniques described below may allow a time for performing the localization operation to be adjusted to after the device is in a moving state.

In one implementation, a device, such as device 102, compares a calculated or adjusted interval to an interval threshold. This threshold may be a period of time set by a user to define when state detection will be performed. The device may then determine whether the interval is less than the interval threshold and perform state detection in response to the determination. For example, the device may perform state detection when the interval is determined to be less than the interval threshold.

The state detection may generally include determining a motion state of the device, such as a still or moving state. The motion state may also be a subset of the still or moving state, such as a moving state of walking or driving. The motion state may be based on data obtained from an accelerometer of the device. This data may be read from the accelerometer continuously or at predetermined times.

The device may perform state detection in an iterative manner until a predetermined condition is satisfied, such as a determination of a moving state. When the moving state is determined, the device may perform a localization operation. The moving state may be further defined into a walking state or a driving state, and the localization operation performed based on a determination of either of these states.

In one implementation, the state detection employs a classifier designed with empirical data. The empirical data may be obtained from collecting accelerometer readings relating to three states and assigning tags to the readings based on user input. The tags may be treated as ground truth. For each tagged reading, a few seconds of data at the start and end may be excluded in order to avoid impact of user interaction. Half of the data may be used as a training set and the other half used as a testing set.

Based on this empirical data, the classifier may be set to $\frac{1}{3}(P_{ss}+P_{ww}+P_{dd}-\alpha P_{ws}-\beta P_{ds})$, where $P_{ij}$ is a confusion probability that a real state i is judged as a detected state j, where i,j∈{s, w, d} representing still (s), walking (w), and driving (d) states, and α and β are used to control a bias against wrong classification from motion states to a still state and are set to 2 and 4, respectively. The classifier may also be biased such that it is more acceptable to mistakenly classify a still state as a motion state than it is to classify a motion state as a still state.

In defining features of the classifier, three base features may also be selected, namely energy, standard deviation, and strongest frequency component (obtained with FFT), which can reasonably distinguish the three states from the raw accelerometer data. These basic features may be used as base-level classifiers using a simple thresholding method. A plurality voting may also be adopted as a meta-level classifier, which is found to perform consistently well across different settings, to conclude the user state from base-level classifier output. The thresholds may be tuned such that the metric is minimized using the training data only.

State detection may be performed continuously or at predetermined times. In one implementation, the state detection is performed every x minutes, and a device is determined to be in a particular state when the device is detected to be in the particular state for consecutive y times. The x and y values may be set based on a user mobility profile which may indicate a general mobility of a user. For example, a user mobility profile indicating that a user moves more frequently may set x to a shorter time. In one instance, x is set to one minute and y is set to three times. This implementation may help to filter out transient state glitches, such as small movement changes of the device that may not actually reflect a state of the device (e.g., stopping at a traffic light). This implementation may also consider an observation that a user typically remains in a same state for a span of time.

Performing state detection at predetermined times may also allow less CPU power to be consumed in obtaining readings from the accelerometer. Although the accelerometer may itself be a passive device, the CPU may consume energy in reading the accelerometer. In one example, it was found that different sampling frequency leads to different power consumption. Here, the power consumption for the accelerometer was found to scale linearly with the sampling frequency $f_s$ when $f_s \leq 50$. The relation may be captured by the following equation in mW unit for one device:

$$P_{accl}=47.1+7.1 f_s \qquad (4).$$

In one example, when targeting a 90% detection ratio, a sampling frequency of 24 Hz over a 4 second duration may be utilized. In this example, the state detection is performed every other minute, and a bursty accelerometer reading at 24 Hz for 4 seconds is performed during each period. Here, a device may be determined to be in a particular state after three consecutive and consistent detections. In other words, it may take one minute to detect a state, and three minutes to conclude a state change.

Illustrative Notification

The following section describes techniques directed to notifying a user or device when a current location of a device is within a predetermined proximity to a destination target. The determination may be in response to a localization operation.

Figure 8:
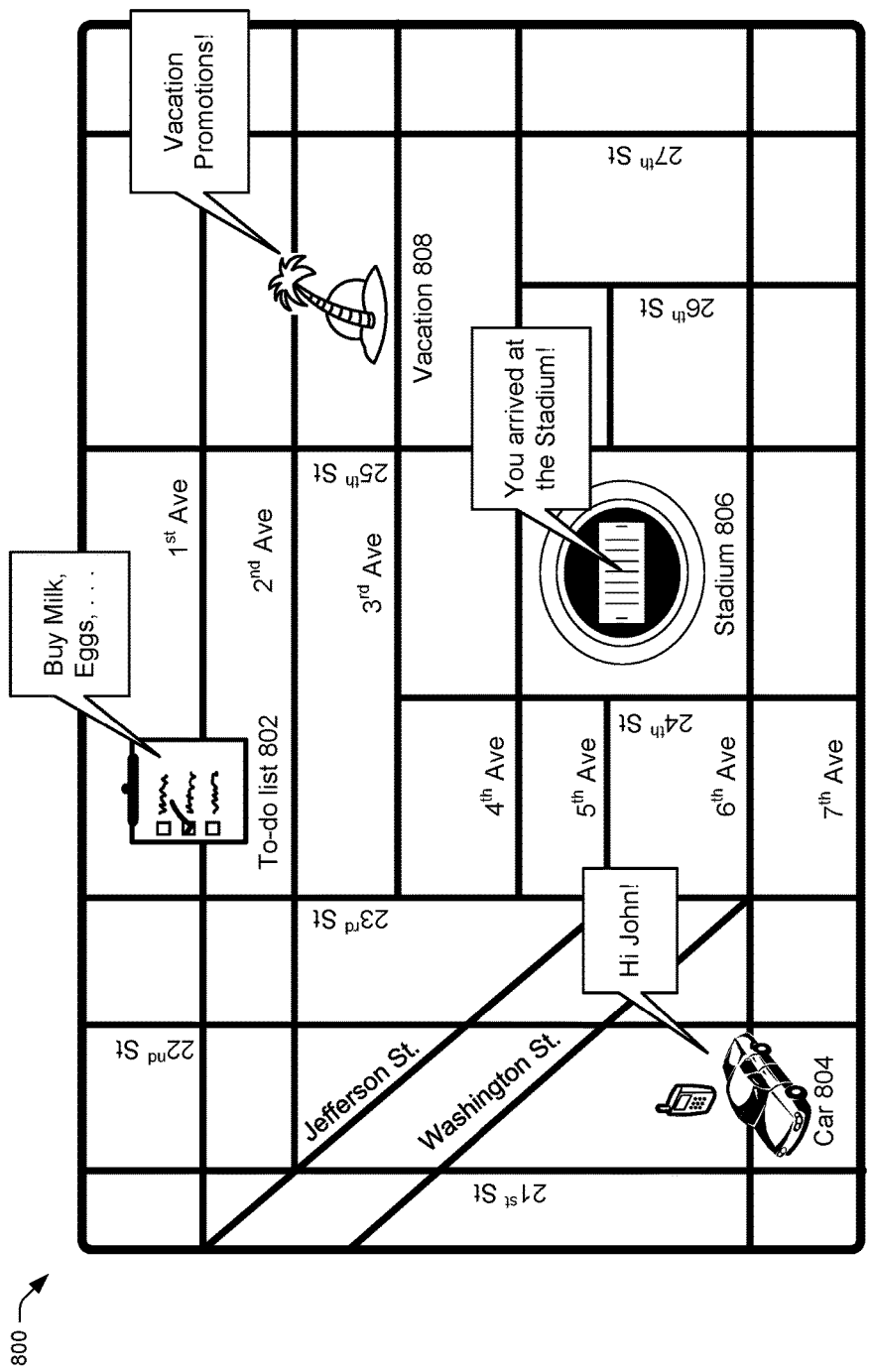
FIG. 8 illustrates an exemplary map of destination targets and notifications that may be provided to a user or device.

FIG. 8 illustrates an exemplary map of destination targets and notifications that may be provided to a user or device, such as device 102. Destination targets and/or notifications may be associated with a location event stored in location event database, such as location event database 134. The notifications may be generated at the device or provided to the device through a network.

Here, each icon 802, 804, 806, and 808 represents a destination target, and each call-out above the corresponding icon represents a notification that may be provided when a device is located in proximity to the destination target. Although FIG. 8 illustrates notification messages that are displayed on the device, it is also appreciated that other notifications may be provided, such as audio notifications.

To-do list icon 802 represents a static destination target associated with a to-do list, such as a store or shopping center. Here, when the device within a predetermined proximity to the destination target represented by icon 802, the message "Buy Milk, Eggs, . . . " is provided to the device to notify the user. This type of notification may be provided in a proximity reminder service where users are notified upon arrival at a location.

Car icon 804 represents a dynamic destination target of a car, or a mobile device of a user traveling in a car. When the device is within a predetermined proximity to this destination target, the message "Hi John!" is provided on the device to indicating that the mobile device of the user is in proximity to the destination target. This type of notification may be provided in a social tracking service where users are notified when they are in proximity to each other.

Stadium icon 806 represents a static destination target of a stadium. Here, when the device is within a predetermined proximity to this destination target, the message "You arrived at the Stadium!" is provided on the device. This type of notification may be provided in a location-based gaming service, such as a mobile social game, where a player must arrive at a particular location to achieve certain tasks.

Vacation icon 808 represents a static destination target associated with a vacation, such as a travel agency. Here, when the device is within a predetermined proximity to this destination target, the message "Vacation Promotions!" is provided on the device. This type of notification may be provided in a proximity reminder service.

The notifications provided in FIG. 8 may also be notifications associated with any type of location-based service, such as a location-based service provided through location service device(s) 104. In this case, the device may send a current location of the device to the location-based service whenever the current location is determined through a localization operation. Meanwhile, the location-based service may monitor the current location and provide a notification when a condition is satisfied, such as the current location being within a predetermined proximity to a destination target.

Illustrative Process

Figure 9:
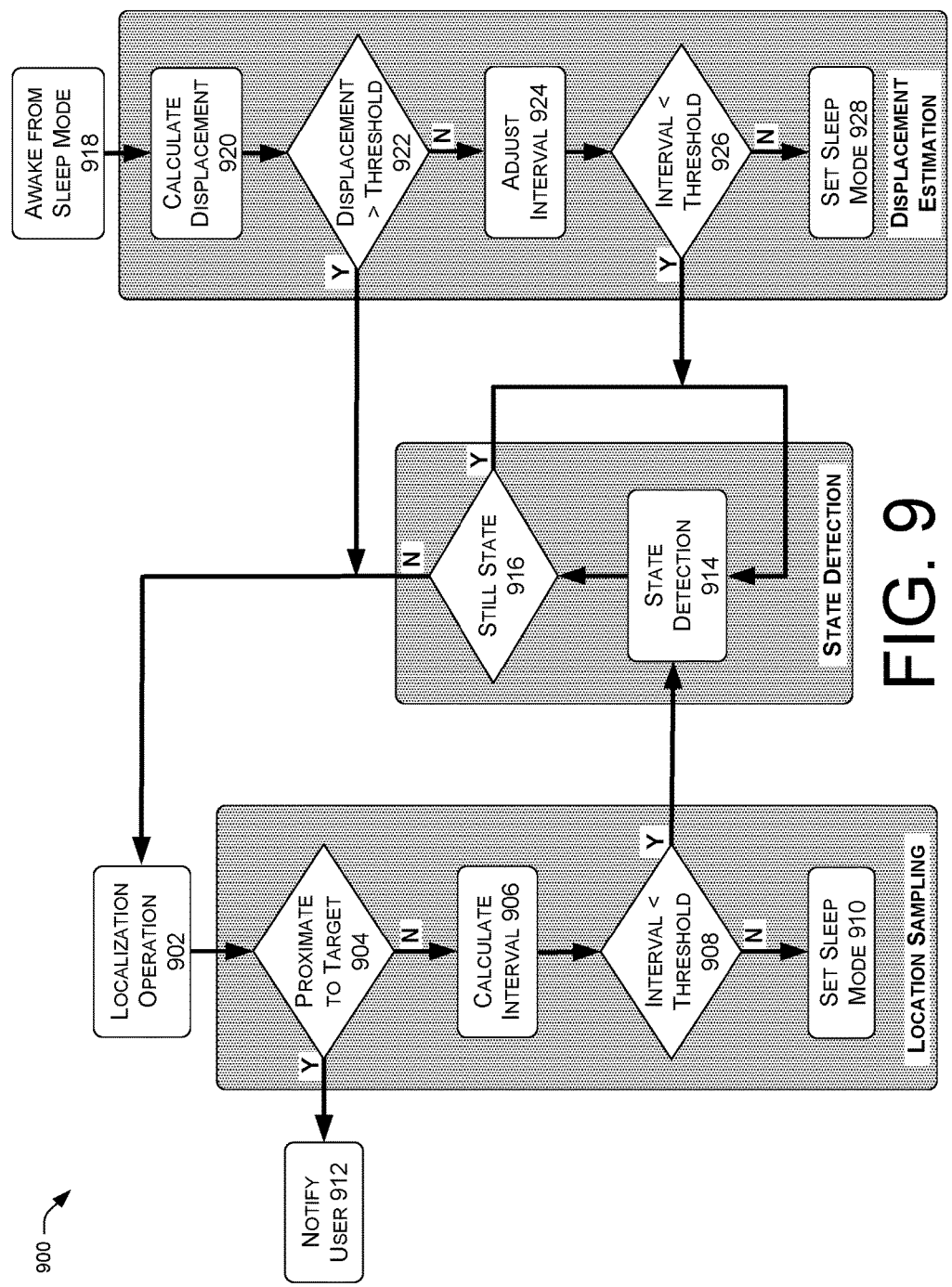
FIG. 9 illustrates an exemplary process of location watching.

The following section describes, in reference to FIG. 9, an exemplary process of location watching. Process 900 (as well as each process described herein) is illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

For ease of illustration, process 900 is described as being performed in the environment 100 of FIG. 1. However, process 900 may be performed in other environments. Moreover, the environment of FIG. 1 may be used to perform other processes.

Process 900 includes an operation 902 for performing a localization operation. This operation may include techniques which determine a location of a device through either location coordinate readings from a global positioning system (GPS), or readings from cell towers and/or wireless access points coupled with online queries. Operation 902 may also include obtaining a first cell reading corresponding to a first plurality of cell towers. Operation 902 may be implemented by localization module 132 of device 102.

Process 900 also includes operations 904, 906, 908, and 910 for implementing location sampling techniques. In particular, operation 904 may include determining whether the device is within a predetermined proximity to a destination target. This operation may utilize the location of the device obtained in operation 902. When operation 904 determines that the device is within the predetermined proximity to the destination target an operation 912 may be performed to notify a user or device. When operation 904 determines that the device is not within the predetermined proximity to the destination target, an operation 906 may be performed. Operation 904 may also include determining whether the device is within a predetermined proximity to one or more of a plurality of destination targets.

Operation 906 may include calculating an interval based on a velocity and a distance from the location obtained in operation 902 to a destination target. This operation may also include calculating the interval based on a distance from the location to a closest destination target among a plurality of destination targets.

Process 900 may also include an operation 908 for comparing the interval calculated in operation 906 with an interval threshold, and determining whether the interval is less than the interval threshold. When the determination determines that the interval is less than the interval threshold, an operation 914 may be performed. When the determination determines that the interval is not less than the interval threshold, an operation 910 may be performed.

Operation 910 may include setting the device to a sleep or suspended mode for the interval calculated in operation 906. This operation may include setting or updating a timer of the device to the duration of the interval. Operations 904, 906, 908, and 910 may be implemented by localization sampling module 126 of device 102 and may include many of the techniques discussed above in the section entitled "Illustrative Location Sampling."

Operation 912 may include notifying a user or device that the device is within a predetermined proximity to a destination target. This operation may include many of the techniques discussed above in the section entitled "Illustrative Notification."

Process 900 may also include operation 914 for performing state detection to determine a motion state of the device. This operation may utilize data obtain from an accelerometer of the device, such as accelerometer 116 of device 102. This operation may also include determining whether the device is in a moving state or a still state. The determined motion state of the device may then be utilized in an operation 916. Operation 916 may include determining whether the determined motion state in operation 914 is the still state. When the determined motion state is the still state, process 900 may return to operation 914 and perform state detection again. When the determined motion state is not the still state, process 900 may proceed to operation 902 and perform a localization operation to determine a new current location of the device. Operations 914 and 916 may be implemented by state detection module 128 of device 102 and may include many of the techniques discussed above in the section entitled "Illustrative State Detection."

Process 900 may also include an operation 918 for waking the device from the sleep or suspended mode. Operation 918 may be performed after the interval has expired. Operation 918 may include triggering a timer that was set for the interval.

Process 900 may include an operation 920 for calculating a displacement distance, which may be performed after operation 918. The displacement distance may be calculated by estimating a displacement from the location obtained in operation 902. This distance may be based on a comparison of the first cell reading obtained in operation 902 and a second cell reading obtained after the device awakes from the sleep or suspended mode. Operation 920 may include calculating the displacement distance in proportion to a number of common cell towers determined from the first and second cell readings.

Process 900 may also include caching cell readings, and utilizing the cached cell readings to calculate the displacement distance. For example, operation 920 may include calculating the displacement distance based on a comparison of the cached cell readings in order. Here, the displacement distance may be a shorter distance when each of the cached cell readings identifies a same cell tower, and the displacement distance may be a longer distance when the cached cell readings, ordered by time of caching, progressively identify a different cell tower.

Process 900 may also include an operation 922 for determining whether the displacement distance is greater than a displacement threshold. When it is determined that the displacement distance is greater than the displacement threshold, process 900 may proceed to operation 902 to perform a localization operation and determine a new current location of the device. The displacement distance may be determined to be greater than the displacement threshold when there is no common cell tower. Alternatively, when it is determined that the displacement distance is not greater than the displacement threshold, process 900 proceeds to an operation 924.

Operation 924 may include adjusting the interval calculated in operation 906 or a previously adjusted interval. This adjusting may include adjusting the interval in proportion to the displacement distance calculated in operation 920. The adjusting may utilize equation (3) described above. Process 900 may also include an operation 926 for comparing the adjusted interval from operation 924 with an interval threshold, and determining whether the interval is less than the interval threshold. When the interval is less than the interval threshold, process 900 may proceed to operation 914 to perform state detection. When the interval is not less than the interval threshold, process 900 may proceed to operation 928.

Operation 928 may include setting the device to a sleep or suspended mode and may include techniques similar to those of operation 910. Process 900 may iteratively perform operations 918, 920, 922, 924, 926, and 928 until a determination in operation 922 or 926 changes a flow of the operations. For example, process 900 may include adjusting an interval multiple times until there is no common cell tower included in two or more cell readings. In this example, the displacement threshold of operation 922 may be set based on no common cell towers, as discussed above.

Operations 920, 922, 924, 926, and 928 may be implemented by displacement estimation module 130 and may include many of the techniques discussed above in the section entitled "Illustrative Displacement Estimation."

Illustrative Optimizations

The following section describes exemplary techniques which may be applied in addition to the techniques described above.

In one implementation, a device may utilize a cell reading or signal of a destination target to determine whether the device is within a predetermined proximity to the destination target. This may be performed in conjunction with operation 904. This implementation may be utilized where a destination target is a static target of a revisited place or where a destination target is a dynamic target and a cellular reading or signal of the destination target is known or obtained. In the case of a dynamic target, the cell reading or signal may be obtained at a same time as when a location of the device is updated through a localization operation.

Here, the device may obtain a cell reading or signal of the destination target through a network or memory of the device. The cell reading or signal may identify a cell tower or cell of the destination target. Meanwhile, the device may compare the cell reading or signal of the destination target with a cell reading or signal of the device. When the comparison indicates that there is no common cell tower or cell, the device may determine that the device is not within the predetermined proximity to the destination target. Alternatively, when the comparison indicates a common cell tower or cell, the device may determine that the device is within the predetermined proximity to the destination target, and the device may notify a user or device.

In another implementation, a device may assign a priority to a plurality of destination targets and calculate or adjust an interval based on one of the plurality of destination targets. These techniques may be utilized when a plurality of destination targets exist. These techniques may avoid maintaining a separate localization schedule for each of the plurality of destination targets.

In this implementation, a device may obtain the plurality of destination targets and assign a priority to each of the plurality of destination targets based on a proximity of the plurality of destination targets. For example, a destination target that is closest to a current location of the device may be assigned a high priority, and a destination target that is farthest from the current location of the device may be assigned a low priority. Meanwhile, the device may calculate an interval based on a distance from the current location to one of the plurality of destination targets having a high priority.

The device may also reassign the priorities of the plurality of destination targets when a localization operation is performed and a new current location of the device is obtained. For example, a destination target being closest to the new location of the device may be reassigned a high priority, and a destination target being farthest from the new location of the device may be reassigned a low priority. Thereafter, the device may calculate a new interval based on a distance from the new current location to the destination target having the newly assigned high priority.

Illustrative Implementation

The following section describes an example implementation for many of the techniques discussed above. In this implementation, these techniques are implemented as a user space middleware on a mobile device running a mobile operating system. Here, an API SetLocationAlert(EventID, Location, Radius) is exposed to other applications, such as a location-aware reminder application.

Meanwhile, the middleware is an always-running application, except during times when the mobile device is set to a sleep or suspended mode. In this implementation, a timer is relied upon to put the mobile device into the sleep or suspended mode. The timer may utilize a low-level system call to awake the mobile device. This approach may allow the mobile device to be awakened when the mobile operating system of the mobile device is not active.

This implementation may also utilize a lightweight database using SQLCE 3.5 to cache and collect radio fingerprints, and associated location data. This may reduce energy consumption for future cellular-based localization needs.

This implementation may also utilize different localization techniques depending on a state of the mobile device. For example, when the mobile device is determined to be indoors, this implementation may utilize cellular-based localization techniques, without relying on GPS. The mobile device may be determined to be indoors when a GPS signal cannot be acquired and the mobile device is in a still state. When in a walking state, this implementation may attempt GPS localization, and resort to cellular-based localization when the GPS localization fails. When in a driving state, this implementation may utilize GPS localization first, and resort other localization techniques when a GPS signal cannot be found.

CONCLUSION

Although embodiments have been described in language specific to structural features and/or methodological acts, it is to be understood that the disclosure is not necessarily limited to the specific features or acts described. Rather, the specific features and acts are disclosed herein as illustrative forms of implementing the embodiments.

What is claimed is:

1. A computing device comprising:
   one or more processors;
   a first sensor;
   a second sensor; and
   one or more computer-readable media storing computer-executable instructions that, when executed by the one or more processors, cause the one or more processors to perform acts comprising:
      performing, using the first sensor and at a first time, a first localization operation to identify a first location of the computing device, the first localization operation including at least one of a satellite-based localization, a cellular-based localization, or a wireless access point-based localization;
      calculating an interval based at least in part on a distance from the first location to a destination location and a first motion state of the computing device;
      obtaining data from the second sensor at a second time subsequent the first time;
      determining a second motion state of the computing device based at least in part on the data from the second sensor;
      modifying the interval based at least in part on the second motion state to create a modified interval; and
      based at least in part on detecting an end of the modified interval, performing, using the first sensor, a second localization operation to identify a second location of the computing device.

2. The computing device as recited in claim 1, wherein the first sensor comprises a Global Positioning System (GPS) sensor and the second sensor comprises an accelerometer.

3. The computing device as recited in claim 1, wherein:
   the first motion state comprises a moving state;
   the second motion state comprises a still state; and
   modifying the interval based at least in part on the second motion state comprises lengthening the interval to create the modified interval.

4. The computing device as recited in claim 1, wherein:
   the second motion state comprises a moving state; and
   modifying the interval based at least in part on the second motion state comprises shortening the interval to create the modified interval.

5. The computing device as recited in claim 1, the acts further comprising:
   after performing the first localization operation, setting the first sensor to a sleep mode or a suspended mode;
   detecting the end of the modified interval; and
   based at least in part on detecting the end of the modified interval, waking the first sensor from the sleep mode or the suspended mode to perform the second localization operation.

6. The computing device as recited in claim 1, the acts further comprising:
   calculating a total interval based at least in part on the distance from the first location to the destination location, the total interval comprising an estimate of a total time to travel from the first location to the destination location, and
   wherein calculating the interval comprises setting the interval to be shorter than the total interval.

7. The computing device as recited in claim 1, the acts further comprising:
   determining that the interval is less than a predefined interval threshold; and
   based at least in part on determining that the interval is less than the predefined interval threshold, determining to (i) obtain the data from the second sensor at the second time and (ii) determine the second motion state of the computing device based at least in part on the data.

8. The computing device as recited in claim 1, wherein determining the second motion state of the computing device comprises determining that the computing device is in a still state; and
   the acts further comprising, based at least in part on determining that the computing device is in the still state:
      periodically obtaining additional data from the second sensor to determine whether the computing device remains in the still state or is in a motion state;
      determining, based at least in part on the additional data, that the computing device has switched from the still state to the motion state; and
      based at least in part on determining that the computing device has switched from the still state to the motion state, performing the second localization operation.

9. A system comprising:
   one or more processors;
   a first sensor communicatively coupled to the one or more processors;
   a second sensor communicatively coupled to the one or more processors; and
   memory storing computer-executable instructions that, when executed by the one or more processors, cause the one or more processors to perform acts comprising:
      performing, using the first sensor, a first localization operation to identify a first location of the system, the first localization operation including at least one of a satellite-based localization, a cellular-based localization, or a wireless access point-based localization;

calculating an interval based at least in part on a distance from the first location to a destination location and a first motion state of the system;

obtaining data from the second sensor;

determining, based at least in part on the data, at least one of a displacement distance or a motion state of the system;

modifying the interval based on at least one of the displacement distance or the motion state of the system to create a modified interval; and based at least in part on the modified interval, scheduling a second localization operation based at least in part on the modified interval.

10. The system as recited in claim 9, the acts further comprising:

determining that the interval is greater than an interval threshold; and based at least in part on determining that the interval is greater than the interval threshold, setting the first sensor to a sleep mode or a suspended mode after performing the first localization operation.

11. The system as recited in claim 9, wherein:

performing the first localization operation includes receiving a first cell reading;

obtaining the data from the second sensor comprises receiving a second cell reading from the second sensor; and determining the at least one of the displacement distance or the motion state of the system comprises determining the displacement distance based at least in part on the first cell reading and the second cell reading; and the acts further comprising:

determining that the displacement distance is less than a threshold displacement distance;

based at least in part on determining that the displacement distance is less than the threshold displacement distance:

determining to modify the interval; and setting the first sensor to a sleep mode or a suspended mode.

12. The system as recited in claim 9, wherein the first sensor comprises at least one of a Global Positioning System (GPS) sensor or a cellular system sensor, and the second sensor comprises an accelerometer.

13. The system as recited in claim 9, wherein:

the motion state of the system comprises a second motion state;

the first motion state comprises a moving state;

the second motion state comprises a still state; and modifying the interval comprises lengthening the interval to create the modified interval.

14. The system as recited in claim 9, wherein:

the motion state of the system comprises a second motion state;

the first motion state comprises a still state;

the second motion state comprises a moving state; and modifying the interval comprises shortening the interval to create the modified interval.

15. One or more computer-readable storage media storing computer-executable instructions that, when executed by one or more processors, cause the one or more processors to perform acts comprising:

performing, using a first sensor associated with a computing device, a first localization operation to identify a first location of the computing device, the first localization operation including at least one of a satellite-based localization, a cellular-based localization, or a wireless access point-based localization;

calculating an interval based at least in part on a distance from the first location to a destination location and a first motion state of the computing device;

obtaining data from a second sensor associated with computing device;

determining, based at least in part on the data, a second motion state of the computing device; and performing, using the first sensor, a second localization operation based at least in part on the interval and the second motion state of the computing device.

16. The one or more computer-readable storage media of claim 15, wherein the first sensor comprises a Global Positioning System (GPS) sensor or a cellular system sensor and the second sensor comprises an accelerometer.

17. The one or more computer-readable storage media of claim 15, the acts further comprising:

determining that the interval is greater than a threshold interval;

based at least in part on determining that the interval is greater than the threshold interval, setting the first sensor to a sleep mode or a suspended mode; and in response to detecting the end of the interval, waking the first sensor from the sleep mode or the suspended mode to perform the second localization operation.

18. The one or more computer-readable storage media of claim 15, wherein the second motion state comprises a still state; and the acts further comprising:

determining that the interval is less than a threshold interval;

based at least in part on determining that the computing device is in the still state, periodically obtaining additional data from the second sensor to determine whether the computing device remains in the still state or is in a motion state;

determining, based at least in part on the additional data, that the computing device has switched from the still state to the motion state; and based at least in part on determining that the computing device has switched from the still state to the motion state, performing the second localization operation.

19. The one or more computer-readable storage media of claim 15, the acts further comprising:

determining, based at least in part on the first location of the computing device and the destination location, whether the computing device is within a predetermined proximity to the destination location;

based at least in part on determining that the computing device is not within the predetermined proximity to the destination location, determining to calculate the interval.

20. The one or more computer-readable storage media of claim 15, wherein:

the first motion state comprises a moving state;

the second motion state comprises a still state; and the acts further comprise:

modifying the interval by lengthening the interval to create a modified interval, wherein the performing the second localization is based at least in part on detecting an end of the modified interval.

* * * * *